(12) United States Patent
Greene et al.

(10) Patent No.: US 9,031,908 B1
(45) Date of Patent: *May 12, 2015

(54) METHOD AND APPARATUS FOR SIMULTANEOUS COMPARISON OF MULTIPLE BACKUP SETS MAINTAINED IN A COMPUTER SYSTEM

(75) Inventors: Christopher Greene, Longwood, FL (US); Kirk Freiheit, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/544,602

(22) Filed: Jul. 9, 2012

Related U.S. Application Data (63) Continuation of application No. 12/415,900, filed on Mar. 31, 2009, now Pat. No. 8,219,528.

(51) Int. Cl.
  *G06F 17/30* (2006.01)
  *G06F 11/20* (2006.01)

(52) U.S. Cl.
  CPC .................. *G06F 11/2017* (2013.01)

(58) Field of Classification Search
  CPC .................. G06F 17/30; G06F 17/00
  See application file for complete search history.

(56) References Cited

U.S. PATENT DOCUMENTS

| | | | |
|---|---|---|---|
| 4,533,296 A * | 8/1985 | Duchesneau et al. | 416/46 |
| 4,891,625 A * | 1/1990 | VanRiper et al. | 340/479 |
| 5,155,824 A | 10/1992 | Edenfield et al. | 711/143 |
| 5,208,781 A * | 5/1993 | Matsushima | 365/230.01 |
| 5,469,565 A * | 11/1995 | Hibi | 714/2 |
| 5,497,483 A | 3/1996 | Beardsley et al. | 714/1 |
| 5,506,580 A | 4/1996 | Whiting | 341/51 |
| 5,532,694 A | 7/1996 | Mayers et al. | 341/67 |
| 5,574,874 A | 11/1996 | Jones et al. | 712/200 |
| 5,611,042 A * | 3/1997 | Lordi | 714/6.1 |
| 5,644,766 A * | 7/1997 | Coy et al. | 1/1 |
| 5,649,152 A | 7/1997 | Ohran et al. | 711/114 |
| 5,778,395 A | 7/1998 | Whiting | 707/204 |
| 5,835,953 A | 11/1998 | Ohran | 711/162 |
| 5,907,672 A | 5/1999 | Matze et al. | 714/8 |
| 5,943,335 A * | 8/1999 | Dilley et al. | 370/360 |

(Continued)

OTHER PUBLICATIONS

Chen, Gwo-Dong, and Tai-Ming Parng. "A database management system for a VLSI design system." In Proceedings of the 25th ACM/IEEE Design Automation Conference, pp. 257-262. IEEE Computer Society Press, 1988.*

*Primary Examiner* — Farhan Syed
(74) *Attorney, Agent, or Firm* — Campbell Stephenson LLP

(57) ABSTRACT

Method and apparatus for simultaneous comparison of multiple backup sets maintained in a computer system are described. A plurality of backup sets of data maintained in a computer system including a hierarchy of objects is managed. In some examples, a graphical user interface (GUI) is displayed on a display coupled to the computer, the GUI having views configured show a first group of backup sets from the plurality of backup sets. Individual objects of a selected backup set in the first group of backup sets are pinned in a pinned view of the views in response to a first command. A second group of backup sets from the plurality of backup sets is shown in the views in response to a second command by sliding individual objects of at least one backup set in the plurality of backup sets across at least one unpinned view of the views with respect to the individual objects of the selected backup set in the pinned view.

16 Claims, 7 Drawing Sheets

(56) References Cited

U.S. PATENT DOCUMENTS

| | | | |
|---|---|---|---|
| 5,948,055 A * | 9/1999 | Pulsipher et al. | 709/202 |
| 5,991,240 A * | 11/1999 | Van Ryzin | 368/47 |
| 6,061,770 A | 5/2000 | Franklin | 711/162 |
| 6,073,222 A | 6/2000 | Ohran | 711/162 |
| 6,085,298 A | 7/2000 | Ohran | 711/162 |
| 6,141,734 A | 10/2000 | Razdan et al. | 711/144 |
| 6,154,694 A * | 11/2000 | Aoki et al. | 701/29.6 |
| 6,189,079 B1 | 2/2001 | Micka et al. | 711/162 |
| 6,212,531 B1 * | 4/2001 | Blea et al. | 1/1 |
| 6,253,193 B1 * | 6/2001 | Ginter et al. | 705/57 |
| 6,282,610 B1 | 8/2001 | Bergsten | 711/114 |
| 6,341,341 B1 | 1/2002 | Grummon et al. | 711/162 |
| 6,353,878 B1 | 3/2002 | Dunham | 711/162 |
| 6,363,488 B1 * | 3/2002 | Ginter et al. | 726/1 |
| 6,389,402 B1 * | 5/2002 | Ginter et al. | 705/51 |
| 6,401,098 B1 * | 6/2002 | Moulin | 707/802 |
| 6,427,140 B1 * | 7/2002 | Ginter et al. | 705/80 |
| 6,434,681 B1 | 8/2002 | Armangau | 711/162 |
| 6,460,054 B1 | 10/2002 | Grummon | 707/204 |
| 6,550,057 B1 * | 4/2003 | Bowman-Amuah | 717/126 |
| 6,564,301 B1 | 5/2003 | Middleton | 711/144 |
| 6,591,351 B1 | 7/2003 | Urabe et al. | 711/162 |
| 6,643,667 B1 | 11/2003 | Arai et al. | 707/200 |
| 6,721,766 B1 * | 4/2004 | Gill et al. | 1/1 |
| 6,760,746 B1 * | 7/2004 | Schneider | 709/203 |
| 6,771,843 B1 | 8/2004 | Huber et al. | 382/305 |
| 6,785,789 B1 | 8/2004 | Kekre et al. | 711/162 |
| 6,792,518 B2 | 9/2004 | Armangau et al. | 711/162 |
| 6,961,838 B2 | 11/2005 | Reuter et al. | 711/203 |
| 6,996,687 B1 | 2/2006 | Kekre et al. | 711/162 |
| 7,350,042 B1 | 3/2008 | Kekre et al. | 711/162 |
| 7,412,433 B2 * | 8/2008 | Anglin et al. | 1/1 |
| 7,447,729 B1 * | 11/2008 | Thakur et al. | 709/200 |
| 7,603,618 B2 * | 10/2009 | Mori et al. | 715/229 |
| 7,657,582 B1 * | 2/2010 | Cram et al. | 707/640 |
| 7,693,878 B2 * | 4/2010 | Anglin et al. | 707/999.2 |
| 7,856,424 B2 * | 12/2010 | Cisler et al. | 707/654 |
| 7,886,048 B1 * | 2/2011 | Holland et al. | 709/224 |
| 7,904,425 B2 * | 3/2011 | Cannon et al. | 707/654 |
| 7,966,293 B1 * | 6/2011 | Owara et al. | 707/654 |
| 8,108,494 B1 * | 1/2012 | Holland et al. | 709/220 |
| 8,219,528 B1 * | 7/2012 | Greene et al. | 707/634 |
| 8,463,798 B1 * | 6/2013 | Claudatos et al. | 707/752 |
| 8,489,817 B2 * | 7/2013 | Flynn et al. | 711/128 |
| 8,548,940 B1 * | 10/2013 | Rajaram et al. | 707/608 |
| 8,676,809 B1 * | 3/2014 | Naftel | 707/746 |
| 8,706,833 B1 * | 4/2014 | Bergant et al. | 709/214 |
| 8,738,669 B1 * | 5/2014 | Hsu et al. | 707/822 |
| 8,762,429 B1 * | 6/2014 | Reeves et al. | 707/812 |
| 2002/0120685 A1 * | 8/2002 | Srivastava et al. | 709/203 |
| 2003/0041220 A1 | 2/2003 | Peleska | 711/162 |
| 2005/0228961 A1 | 10/2005 | Reuter et al. | 711/165 |
| 2005/0237572 A1 * | 10/2005 | Mori et al. | 358/1.17 |
| 2005/0246631 A1 * | 11/2005 | Mori et al. | 715/515 |
| 2007/0136381 A1 * | 6/2007 | Cannon et al. | 707/200 |
| 2008/0034307 A1 * | 2/2008 | Cisler et al. | 715/764 |
| 2008/0177994 A1 * | 7/2008 | Mayer | 713/2 |
| 2008/0243958 A1 * | 10/2008 | Prahlad et al. | 707/204 |
| 2008/0307019 A1 * | 12/2008 | Weiss et al. | 707/204 |
| 2009/0089341 A1 * | 4/2009 | Skaria et al. | 707/204 |
| 2009/0164527 A1 * | 6/2009 | Spektor et al. | 707/204 |
| 2009/0199133 A1 * | 8/2009 | Deutsch et al. | 715/811 |
| 2009/0248737 A1 * | 10/2009 | Shukla et al. | 707/103 R |
| 2010/0070491 A1 * | 3/2010 | Cragun et al. | 707/722 |
| 2011/0219035 A1 * | 9/2011 | Korsunsky et al. | 707/784 |
| 2013/0036088 A1 * | 2/2013 | Orenstein et al. | 707/610 |

\* cited by examiner

METHOD AND APPARATUS FOR SIMULTANEOUS COMPARISON OF MULTIPLE BACKUP SETS MAINTAINED IN A COMPUTER SYSTEM

BACKGROUND OF THE INVENTION

1. Field of the Invention

This application is a continuation of U.S. patent application Ser. No. 12/415,900, entitled "Method and Apparatus for Simultaneous Comparison of Multiple Backup Sets Maintained in a Computer System" filed Mar. 31, 2009 now U.S. Pat. No. 8,219,528 and naming Christopher Greene, Kirk Freiheit as the inventors. This application is assigned to Symantec Corporation, the assignee of the present invention, and is hereby incorporated by reference in its entirety and for all purposes as if completely and fully set forth herein.

The present invention relates generally to computer systems. More particularly, the present invention relates to method and apparatus for simultaneous comparison of multiple backup sets maintained in a computer system.

2. Description of the Related Art

Computer systems typically include many computers coupled to a network. For data protection, such computer systems can include one or more backup appliances for backing up data stored on the computers. For example, a computer network may include a server configured to manage a domain in the computer system (referred to as a "domain controller"). The domain controller is configured to store information about network resources of the domain in a database. The database can include a hierarchical structure of objects that represent these network resources. A backup appliance can be configured to backup the database of the domain controller. Typically, the backup appliance would perform such a backup task periodically according to a schedule. As such, the backup appliance can maintain several different copies of the backed up data (referred to as "backup sets"). A database of a domain controller is just one example of a type of data that can be backed-up in a computer system. For example, other types of databases can be backed-up, such as e-mail databases and the like. In another example, other types of data can be backed-up, such as file systems, disk images, and the like for various workstation computers in the computer system.

A backup appliance can restore backed-up data to a target computer in the computer system. In cases where multiple backup sets are maintained, an administrator must select an appropriate backup set to restore. In some cases, the entire backup set is restored ("complete restore"). In other cases, only some objects in a backup set need to be restored ("granular restore"). A backup set may include a large number of objects. Thus, for a granular restore, an administrator might have to search through and compare a large number of objects across many backup sets to search for particular versions of the objects to be restored. This searching and comparison can be time consuming and error prone.

SUMMARY OF THE INVENTION

An aspect of the invention relates to a method and apparatus for managing, on a computer, a plurality of backup sets of data maintained in a computer system, the data including a hierarchy of objects. In some embodiments, a graphical user interface (GUI) is displayed on a display coupled to the computer, the GUI having views configured show a first group of backup sets from the plurality of backup sets. Individual objects of a selected backup set in the first group of backup sets are pinned in a pinned view of the views in response to a first command. A second group of backup sets from the plurality of backup sets is shown in the views in response to a second command by sliding individual objects of at least one backup set in the plurality of backup sets across at least one unpinned view of the views with respect to the individual objects of the selected backup set in the pinned view.

In some embodiments, each of the views is configured to show a GUI control representing the hierarchy of objects for a respective one of the plurality of backup sets. In some embodiments, the data comprises a database of network elements in the computer system, where the hierarchy of objects including information related to at least one of: network resources, network services, or network users. In some embodiments, an additional view is displayed adjacent to the views in the GUI, where the additional view configured to show individual objects of a live copy of the data in the computer system. The individual objects of the live copy of the data in the additional view are pinned with respect to the individual objects of the at least one backup set being slid across the at least one unpinned view. In some embodiments, the individual objects of the selected backup set in the pinned view are unpinned in response to a third command subsequent to the second command. Individual objects of another selected backup set in the second group of backup sets are pinned in another pinned view of the views in response to a fourth command. In some embodiments, the individual objects of the selected backup set in the pinned view are unpinned in response to a third command subsequent to the second command. A third group of backup sets from the plurality of backup sets is shown in the views in response to a fourth command by sliding individual objects of backup sets in the plurality of backup sets across the views. Individual objects of another selected backup set in the third group of backup sets are pinned in a respective one of the views in response to a fifth command.

Another aspect of the invention relates to a method for managing, on a computer, a plurality of backup sets of data maintained in a computer system, the data including a hierarchy of objects. In some embodiments, a GUI is displayed on a display coupled to the computer, the GUI having a merged view and views configured show a first group of backup sets from the plurality of backup sets, the merged view being adjacent to the views. In response to a first command, a first object of a first backup set in the first group of backup sets as shown in a respective one of the views is selected, and a second object of a second backup set in the first group of backup sets as shown in a respective one of the views is selected. A second group of backup sets from the plurality of backup sets in the views is shown in response to a second command by sliding individual objects of backup sets in the plurality of backup sets across the views with respect to the merged view, where the first object and the second object are slid into the merged view where the first object and the second object are pinned.

In some embodiments, each of the views is configured to show a GUI control representing the hierarchy of objects for a respective one of the plurality of backup sets. In some embodiments, the data comprises a database of network resources in the computer system, and the hierarchy of objects includes information related to at least one of: network resources, network services, or network users. In some embodiments, an additional view is displayed adjacent to the merged view in the GUI, the additional view configured to show individual objects of a live copy of the data in the computer system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
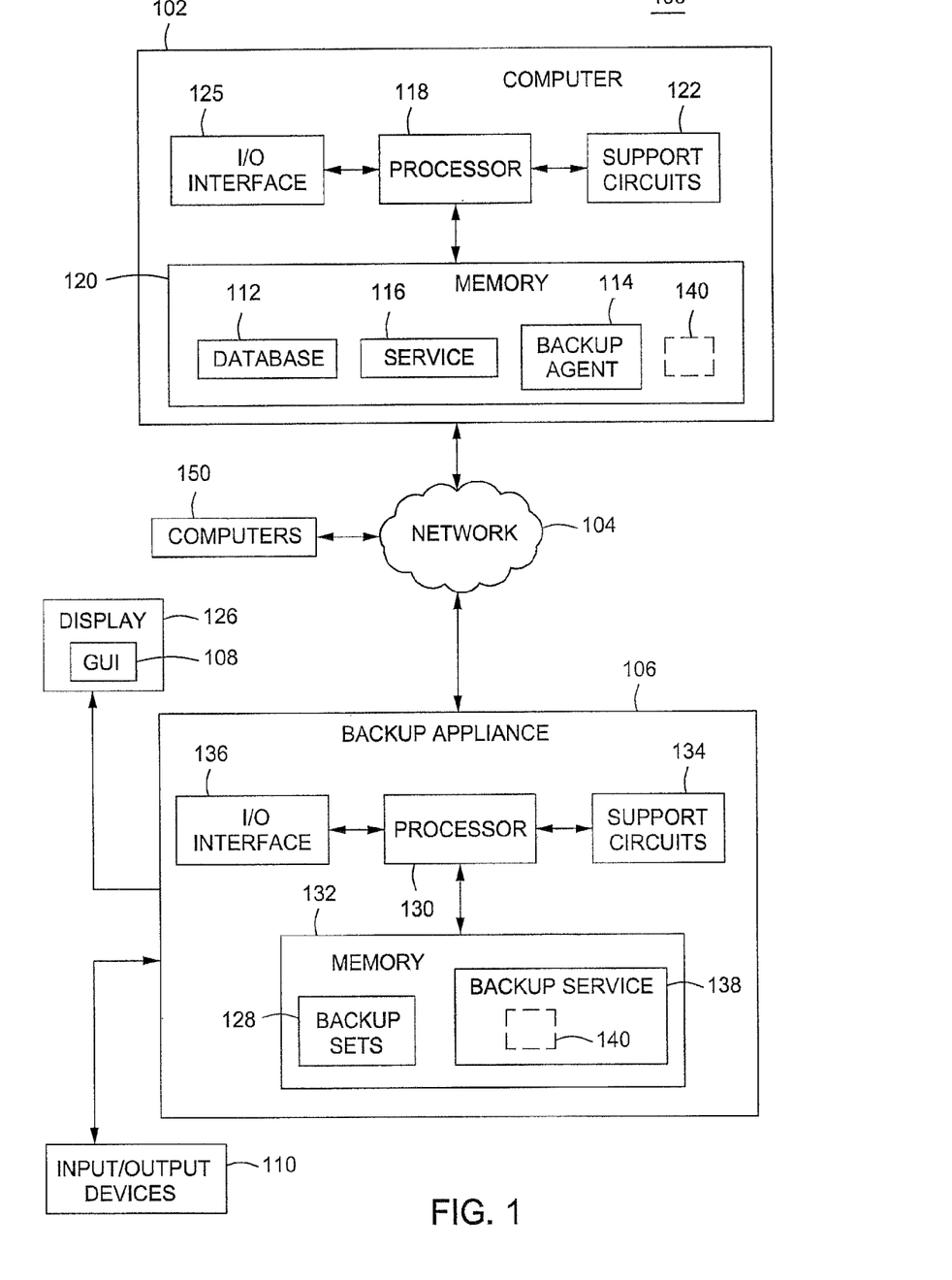
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a computer 102, a network 104, and a backup appliance 106. The network 104 comprises a communication system that connects computer systems by wire, cable, fiber optic, and/or wireless links facilitated by various types of well-known network elements, such as hubs, switches, routers, and the like. In particular, the network 104 may connect the client computer 102 and the backup appliance 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Alternatively, the network 104 may comprise a storage area network (SAN) implemented using fibre channel (FC) or the like.

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 is configured with a service 116 and a backup agent 114. Each of the service 116 and the backup agent 114 may include software (e.g., program code) stored in the memory 120 and configured for execution by the processor 118. In some embodiments, the service 116 can provide any type of network service to other computers 150 on the network. The service 116 is configured to maintain a database 112 stored in the memory 120. The database 112 includes various objects. For example, the service 116 can be a domain controller, and the database 112 can include a hierarchy of objects representative of network elements on the network 104. The network elements may include network resources, network services, and/or network users. An exemplary domain controller service is MICROSOFT ACTIVE DIRECTORY. In general, the service 116 can be any type of service that maintains a database of objects, such as an e-mail service having a database of e-mail related objects, a file service having a database of files (e.g., a file system, network share, etc.), and the like. In some embodiments, the service 116 may be an operating system (OS) or the like, and the database may be a file system having files.

The backup agent 114 is configured to interact with the backup appliance 106 over the network 104 to back up the database 112 thereto. The backup agent 114 may perform such a backup operation periodically in accordance with a schedule so that several different backups of the database 112 are made.

The backup appliance 106 illustratively includes a processor 130, a memory 132, various support circuits 134, and an I/O interface 136. The backup appliance 106 may be coupled to a display 126 and various input/output devices 110. The processor 130 may include one or more microprocessors known in the art. The support circuits 134 for the processor 130 include conventional cache, power supplies, clock circuits, data registers, I/O interfaces, and the like. The I/O interface 136 may be configured for communication with the network 104, the display 126, and the input/output devices 110. The memory 132 may include one or more of the following random access memory, read only memory, magneto-resistive read/write memory, optical read/write memory, cache memory, magnetic read/write memory, and the like.

The backup appliance 106 is configured with a backup service 138. The backup service 138 may include software (e.g., program code), stored in the memory 132, configured for execution by the processor 130. The backup service 138 is configured to cooperate with backup agents to backup target data in computers. For example, the backup service 138 can cooperate with the backup agent 114 to backup the database 112. The backup service 138 may perform such backup operations in accordance with a schedule such that multiple backup sets are maintained in the memory 132 for each target data. For example, the backup service 138 may maintain backup sets 128 of the database 112.

In some embodiments, the backup service 138 includes a restore manager 140. The restore manager 140 can include software (e.g., program code), stored in the memory 132, configured for execution by the processor 130. The restore manager 140 is configured to display a graphical user interface (GUI) 108 on the display 126. An administrator may interact with the restore manager 140 through the GUI 108 and the input/output devices 110. The restore manager 140 enables comparison of individual objects of all or a portion of the backup sets 128 for the purpose of readily identifying particular objects for granular restore. In particular, the restore manager 140 enables various ones of the backup sets 128 to be pinned or repositioned and slide across the GUI 108 in order to facilitate visual comparison of individual objects across different backup sets. Exemplary embodiments of the GUI 108 and processes performed by the restore manager 140 are described below.

Although the restore manager 140 is shown as being executed by the backup appliance 106, it is to be understood that the restore manager 140 can be executed by other computers on the network 104 that have access to the backup sets 128 or data representative of the contents of the backup sets 128 stored by the backup appliance 106. For example, the restore manager 140 can be executed by the computer 102, which can be coupled to a display and input/output devices (not shown) in similar fashion to the backup appliance 106.

Figure 2:
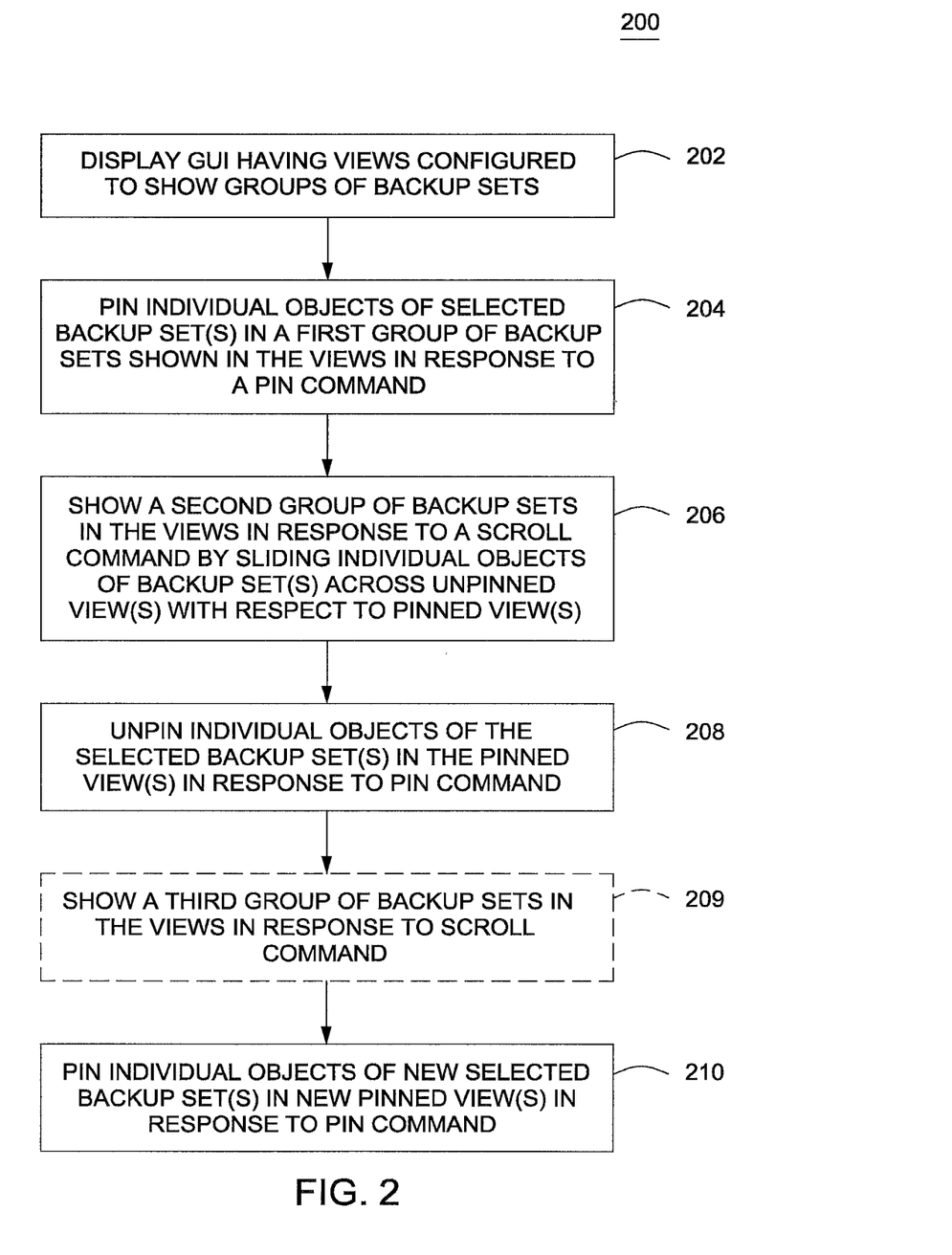
FIG. 2 is a flow diagram depicting a method of managing backup sets of data maintained in a computer system according to some embodiments of the invention.

FIG. 2 is a flow diagram depicting a method 200 of managing backup sets of data maintained in a computer system according to some embodiments of the invention. The method 200 may be performed by the restore manager 140 described above in FIG. 1. Aspects of the method 200 may be understood with reference to the elements of the computer system 100 shown in FIG. 1.

The method 200 begins at step 202, where the restore manager 140 displays the GUI 108 on the display 126. The GUI 108 generally includes views configured to show a group of the backup sets 128 (e.g., two of more of the backup sets 128). In some cases, there are not enough views to show all of the backup sets 128 (e.g., the group of backup sets is less than all of the backup sets 128). The restore manager 140 may initially show a first group of the backup sets 128 in the views of the GUI 108.

Figure 3A:
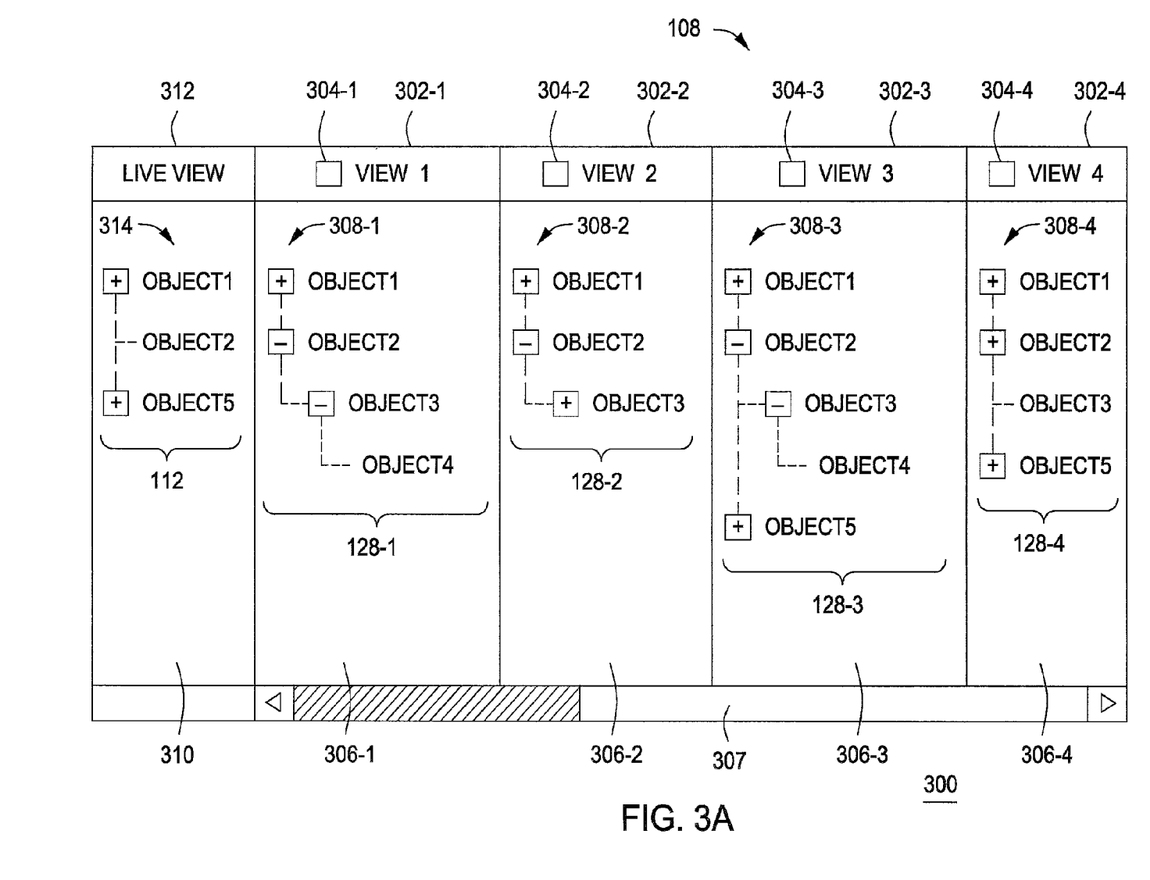
FIG. 3A illustrates an initial view of a GUI according to some embodiments of the invention.

FIG. 3A illustrates an initial view 300 of the GUI 108 according to some embodiments of the invention. The GUI 108 includes a plurality of views 306 (e.g., four views 306-1 through 306-4 are shown). The views 306 include headers 302 (e.g., four headers 302-1 through 302-4 are shown). The headers 302 include labels for the views 306 (e.g., "View 1" through "View 4"). Each of the views 306 is configured to show at least a portion of a respective one of the backup sets 128. A backup set can be represented in a view in a number of ways. In general, each of the views 306 includes a GUI control 308 (e.g., four GUI controls 308-1 through 308-4 are shown) that represents individual objects of a given one of the backup sets 128. For example, in some non-limiting embodiments, the GUI controls 308 comprise tree-controls that represent an expandable hierarchy of objects. Other types of GUI controls may be employed. In other embodiments, the individual objects of a backup set may be shown in rows of each of the views 306. It is to be understood that the various GUI representations may be employed for showing the objects of the backup sets. For purposes of clarity by example, the GUI controls 308 are shown as tree-controls.

In the initial view, a first group of the backup sets 128 are shown in the views 306, designated as backup sets 128-1 through 128-4. Four objects of the backup set 128-1 are shown in the view 306-1, designated objects 1-4. In particular, object 1 is shown un-expanded, object 2 is shown expanded to include object 3, and object 3 is shown expanded to include object 4. Three objects of the backup set 128-2 are shown in the view 306-2, designated objects 1-3. In particular, object 1 is shown un-expanded, object 2 is shown expanded to include object 3, and object 3 is shown unexpanded. Five objects of the backup set 128-3 are shown in the view 306-3, designated objects 1-5. In particular, object 1 is shown un-expanded, object 2 is shown expanded to include object 3, and object 3 is shown expanded to include object 4, and object 5 is shown unexpanded. Four objects of the backup set 128-4 are shown in the view 306-4, designated objects 1-3 and 5. In particular, object 1 is shown un-expanded, object 2 is shown expanded to include object 3, and object 5 is shown unexpanded. The configuration of objects in the backup sets 128-1 through 128-4 is merely illustrative. Further, a backup set may include more or less than the numbers of objects shown.

The GUI 108 also includes a scroll control 307. The scroll control 307 is shown positioned under the views 306, but may be positioned anywhere within the GUI 108. The scroll control 307 is configured to receive input and, responsive to the input, forward a scroll command to the restore manager 140. The scroll command can indicate a leftward or rightward scroll. The scroll control 307 can be used to slide backup sets across the views 306 horizontally left or right. For example, the scroll control 307 may be used to slide the backup sets 128-2, 128-3, and 128-4 from the views 306-2, 306-3, and 306-4 to the views 306-1, 306-2, and 306-3 in response to a left scroll request. The backup set 128-1 in the view 306-1 is hidden from view, and the view 306-4 would show a previously hidden backup set (if any). In this manner, all of the backup sets 128 may be viewed within the four views 306-1 through 306-4. Those backup sets 128 hidden from view may be displayed by using the scroll control 307. Those of the backup sets 128 shown in the views 306 are referred to as a group of backup sets. As shown in FIG. 3A, the views 306 show a first group of the backup sets 128, i.e., backup sets 128-1 through 128-4.

In some embodiments, the GUI 108 may be configured with a live view 310. The live view 310 can include a header 312, with a label therein (e.g., "live view" is shown). The live view 310 can show the current state of the database 112 that is the target of the backup sets 128 (e.g., a live copy of the database 112). In particular, the live view 310 can include a GUI control 314, similar to the GUI controls 308. In the present example, the live view 310 shows three objects 1, 2, and 5 of the database 112. The individual objects of the database 112 can be pinned in the live view 312. In this manner, an administrator can pin and slide different backup sets and compare such backup sets to a live copy of the database 112. Such a comparison can facilitate restore of particular objects to the database 112.

In some embodiments, each of the views 306 can show all objects of a respective one of the backup sets 128. In other embodiments, each of the views 306 can show less than all of the objects of a respective one of the backup sets 128. For example, in some embodiments, the views 306 may be configured to show only those objects of the respective backup sets that are different from objects currently stored in the database 112. Thus, objects in the backup sets that are the same as the objects currently in the database 112 may be hidden from view. The views 306 may be configured to only show the different objects either with the GUI 108 having the live view 310 or with the GUI 108 not having the live view 310. Such filtering of objects can result in the views 306 having less objects being shown.

In some embodiments, differences between objects in different backup sets across the views 306 can be emphasized. For example, in a scenario described above, the views 306 can be configured to show only those objects in the respective backup sets that are different from the current database 112. In a further refinement, objects between multiple backup sets in the views 306 that are the same (but also different from the live database 112) can be de-emphasized (e.g., grayed out or the like), and/or objects between multiple backup sets in the views 306 that are different can be emphasized (e.g., highlighted, bolded, and the like). The above emphasis/de-emphasis scenario may also be employed if the views 306 are configured to show all of the objects, rather than just the different objects from the live database 112.

Returning to FIG. 2, the method 200 proceeds from step 202 to step 204. At step 204, the restore manager 140 pins individual objects of one or more selected backup sets in a first group of backup sets in response to a pin command. By "pinned", it is meant that the selected backup set(s) will remain displayed in respective view(s) regardless of any scroll commands. Referring to the example of FIG. 3A, the GUI 108 can include pin controls 304 (e.g., four pin controls 304-1 through 304-4 are shown). The pin controls 304 are shown positioned within the headers 302, but may be positioned anywhere within the GUI 108. Each pin control 304 is configured to receive input and, responsive to the input, forward a pin command to the restore manager 140. The pin command can indicate an active or inactive pin. In response to an active pin command, the restore manager 140 can pin the backup set shown in the respective view. In response to an inactive pin command, the restore manager 140 can unpin the backup set shown in the respective view. A view that is pinned is referred to as a "pinned view". A view that is not pinned is referred to as an "unpinned view".

Referring again to FIG. 2, the method 200 proceeds from step 204 to step 206. At step 206, the restore manager 140 shows a second group of backup sets in the views in response to a scroll command. The restore manager 140 can slide individual objects of one or more of the backup sets 128 across one or more unpinned views with respect to pinned view(s).

Figure 3B:
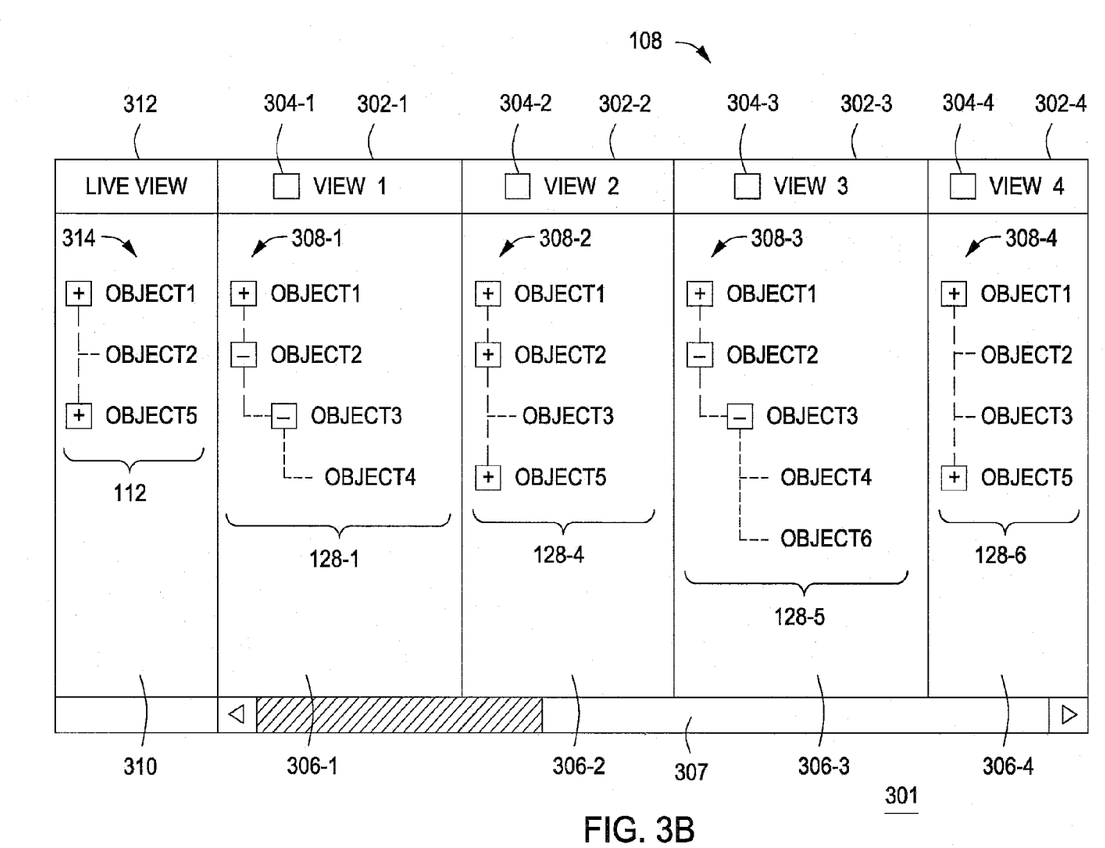
FIG. 3B illustrates a subsequent view of the GUI shown in FIG. 3A after a scroll command according to some embodiments of the invention.

For example, FIG. 3B illustrates a subsequent view 301 of the GUI 108 after a scroll command according to some embodiments of the invention. Elements of FIG. 3B that are the same or similar to those of FIG. 3 are designated with identical reference numerals and described in detail above. The example of FIG. 3B assumes that the view 306-1 has been pinned in step 204 such that the individual objects 1-4 of the backup set 128-1 remain fixed to the view 306-1. The views 306-2 through 306-4 are unpinned views. Further, the example of FIG. 3B assumes a leftward scroll of two backup sets. Thus, the view 306-2 shows the backup set 128-4, while the backup sets 128-2 and 128-3 are hidden from view. The views 306-3 and 306-4 now show new backup sets 128-5 and 128-6, respectively, that were previously hidden from view. The view 301 of the GUI 108 is merely exemplary. Any number of the views 306 can be pinned, and any number of backup sets can be slid either leftward or rightward with respect to the pinned view(s).

By pinning one or more backup sets, and sliding one or more backup sets leftward or rightward, an administrator can efficiently compare the individual objects of different backup sets with one another. For example, an administrator may want to compare the objects in one backup set with objects of other backup sets, including those hidden from display at any one time. Since the selected backup set can be pinned, other backup sets can be slid across the unpinned views to display hidden backup sets without hiding the selected backup set.

Returning to FIG. 2, the method 200 can be generally extended to pinning, scrolling, unpinning, scrolling again, repinning, etc. For example, the method 200 may proceed from step 206 to step 208. At step 208, the restore manager 140 can unpin the individual objects of the selected backup set(s) in the pinned view(s) in response to a pin command. At step 210, the restore manager 140 can pin the individual objects of new selected backup set(s) in new pinned view(s) in response to a pin command. In another embodiment, at optional step 209 between steps 208 and 210, the restore manager 140 can show a third group of backup sets in the views in response to a scroll command. Thus, backup sets can be unpinned, new backup sets can be slid into view and pinned.

In the embodiments described above, the GUI 108 has been shown as having columnar views across which the backup sets can be pinned and slid horizontally. It is to be understood that the views of the GUI 108 can be configured in different arrangements. For example, the views can be rows and backup sets can be pinned and slid vertically across rows. In another example, the views can be multidimensional. For example, views can be arranged in a rectangular grid of columns and rows and can be pinned and scrolled in both horizontal and vertical directions. In other embodiments, rather than having the backup set adjacent to a pinned backup set disappear from view after a scroll command, the adjacent backup set can be shown with the pinned backup set using data overlay and transparency GUI features. For example, the pinned backup set can overlay another backup set that has been slid into the respective pinned view.

Figure 4:
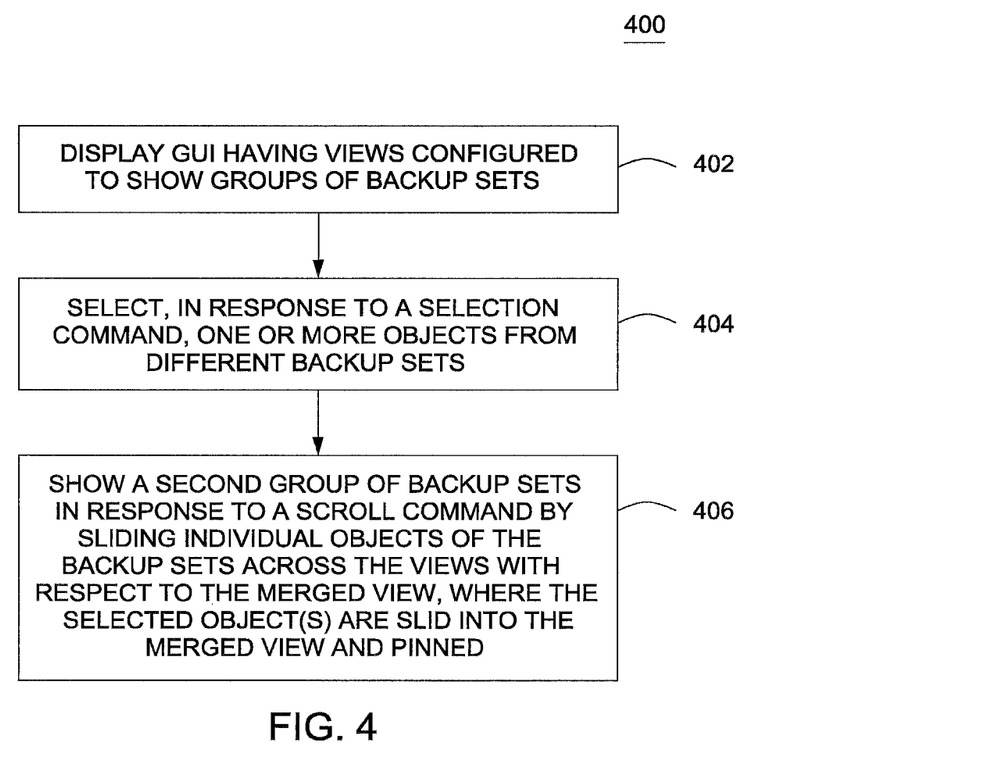
FIG. 4 is a flow diagram depicting a method of managing backup sets of data maintained in a computer system according to some embodiments of the invention.

FIG. 4 is a flow diagram depicting a method 400 of managing backup sets of data maintained in a computer system according to some embodiments of the invention. The method 400 may be performed by the restore manager 140 described above in FIG. 1. Aspects of the method 400 may be understood with reference to the elements of the computer system 100 shown in FIG. 1.

The method 400 begins at step 402, where the restore manager 140 displays the GUI 108 on the display 126. The GUI 108 generally includes views configured to show a group of the backup sets 128 (e.g., two of more of the backup sets 128). In some cases, there are not enough views to show all of the backup sets 128 (e.g., the group of backup sets is less than all of the backup sets 128). The restore manager 140 may initially show a first group of the backup sets 128 in the views of the GUI 108. The GUI 108 further includes a merged view. The merged view can be initially empty. As discussed below, after a scroll operation, the merged view can include objects from different backup sets. The GUI 108 may also show a live view, as described above.

Figure 5A:
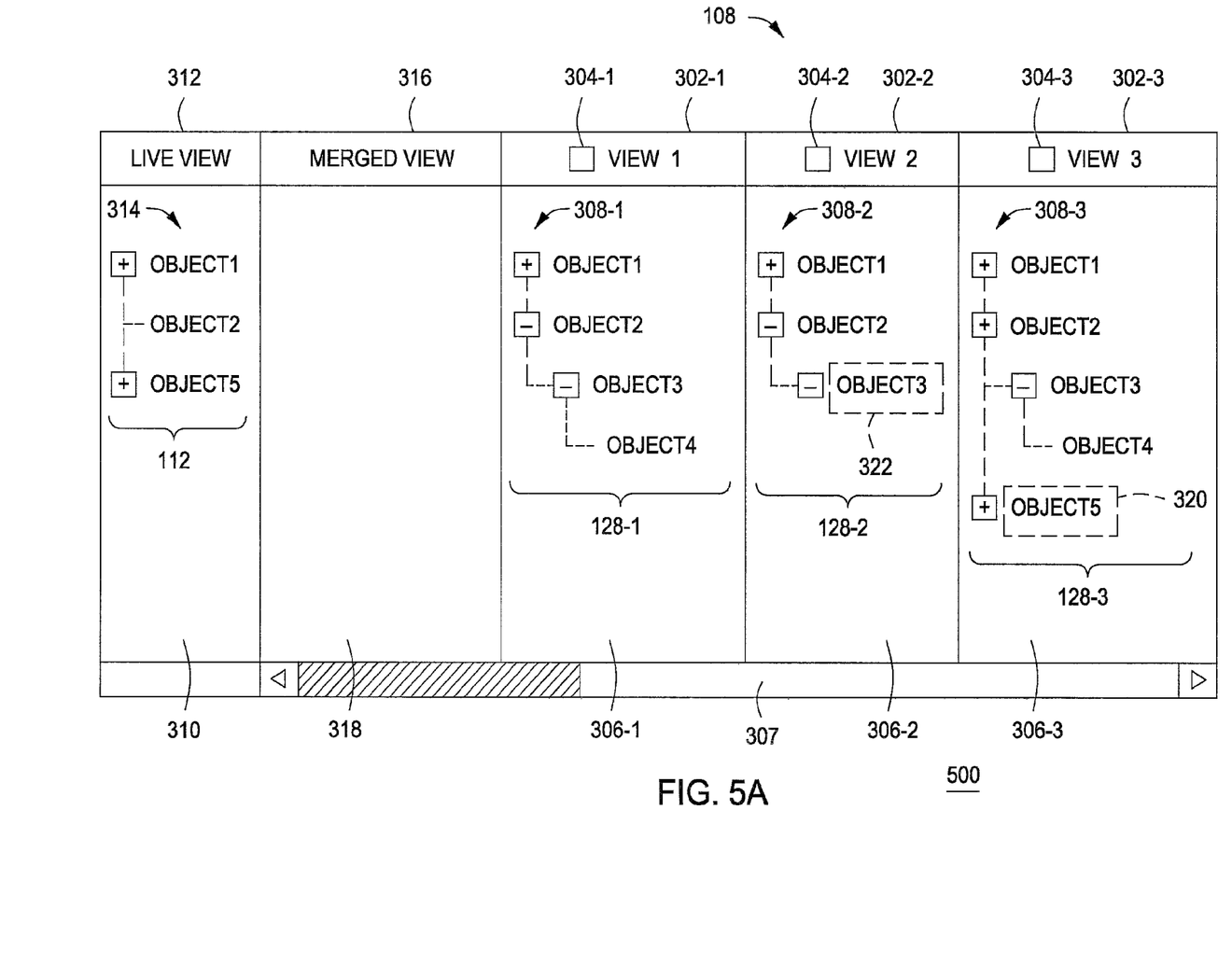
FIG. 5A illustrates an initial view of a GUI according to some embodiments of the invention.

FIG. 5A illustrates an initial view 500 of the GUI 108 according to some embodiments of the invention. Elements in FIG. 5A that are the same or similar to those of FIG. 3A are designated with identical reference numerals and described in detail above. For purposes of clarity, the view 306-4 and associated elements are omitted in FIG. 5A. The GUI 108 includes a merged view 318. The merged view 318 can include a header 316 with a label therein (e.g., "merged view"). In the view 500, the merged view 318 is initially empty, as described above in step 402.

Returning to FIG. 4, the method 400 proceeds from step 402 to step 404. At step 404, the restore manager 140 selects, in response to a selection command, one or more objects from different backup sets. For example, the restore manager 402 can select a first object of a first backup set in a first group of backup sets shown in the views, and a second object of a second backup set in the first group of backup sets. As shown in FIG. 5A, a selection 320 selects object 5 of the backup set 128-3 in the view 306-3, and a selection 322 selects object 3 in the backup set 128-2 in the view 306-2. The selections 320 and 322 may be any type of GUI element, such as highlighted (inverse) text, bounding boxes, or the like type elements to visually distinguish selected objects from unselected objects.

The method 400 proceeds from step 404 to step 406. At step 406, the restore manager 140 shows a second group of backup sets in response to a scroll command. The restore manager 140, in response to the scroll command, slides individual objects of backup sets across the views with respect to the merged view. As the backup sets are slid, any selected objects are slid into the merged view and are thereafter pinned in the merged view.

Figure 5B:
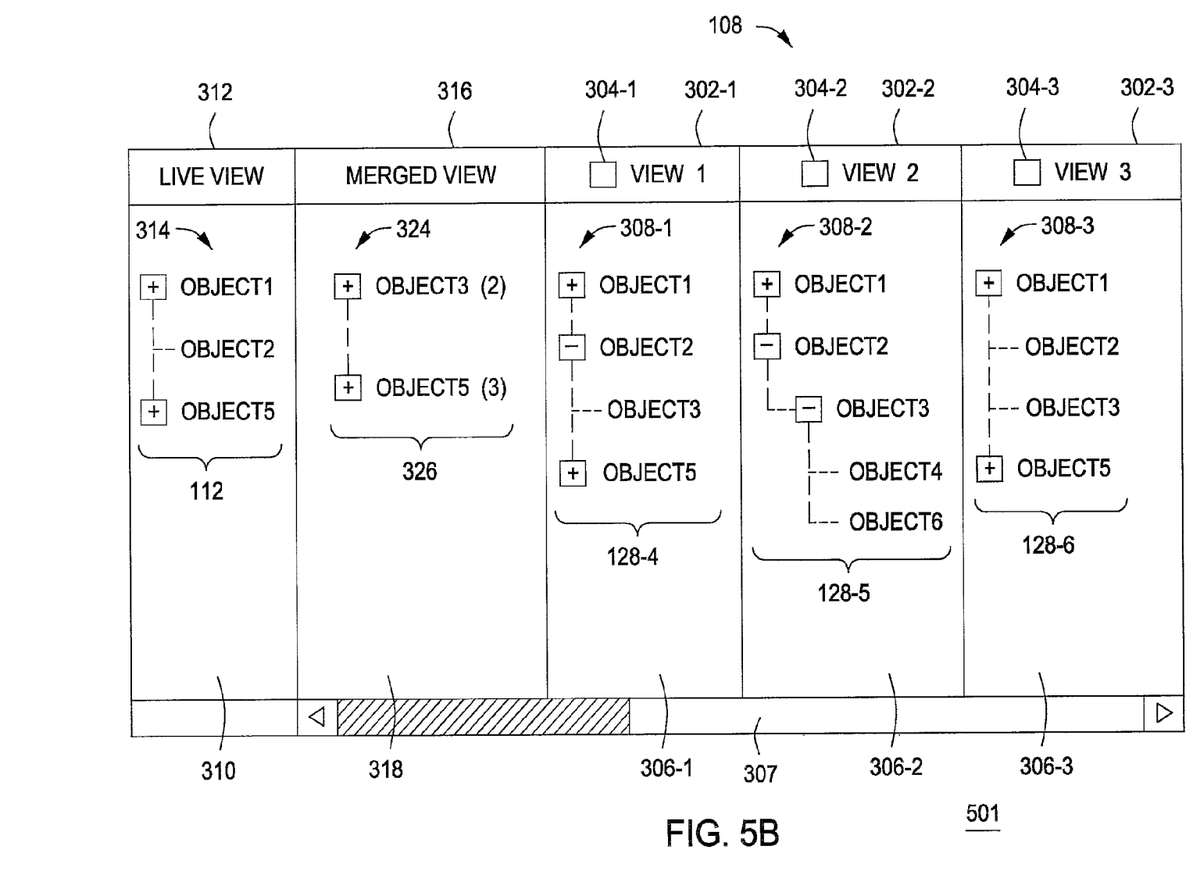
FIG. 5B illustrates a subsequent view of the GUI shown in FIG. 5A after a scroll command according to some embodiments of the invention.

FIG. 5B illustrates a subsequent view 501 of the GUI 108 after a scroll command according to some embodiments of the invention. Elements of FIG. 5B that are the same or similar to those of FIG. 5 are designated with identical reference numerals and described in detail above. The example of FIG. 5B assumes that the backup sets have been scrolled leftward by three backup sets. Thus, the view 306-1 shows a backup set 128-4, the view 306-2 shows a backup set 128-5, and the view 306-3 shows a backup set 128-6. The objects selected by the selections 320 and 322 are shown in the merged view 318 by a GUI control 324. The GUI control 324 can be the same or similar to the GUI controls 308, described above. The objects in the merged view 318 form a merged backup set 326. The objects can include indication of which backup set they belong. In the present example, a parenthetical expression is placed after the object to indicate the backup set, although other techniques can be used.

In this manner, an administrator can select different objects from different backup sets and relate them into a merged backup set by selecting and sliding, as described above. The administrator can pick and choose different objects from different backup sets, have them all stored in the merged view, and then restore from the merged view.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, in a computer that includes a processor and a memory comprising:
    pinning a first visual representation of a first backup set comprising a first individual object in a graphical user interface (GUI), wherein
        the first backup set is one of a plurality of backup sets, and
        the first visual representation of the first backup set comprising the first individual object is displayed in a first view of a plurality of views of the GUI;
    displaying a second visual representation of a second backup set comprising a second individual object in the GUI, wherein
        the second backup set is one of the plurality of backup sets,
        the second backup set is distinct from the first backup set, and
        the second visual representation of the second backup set comprising the second individual object is displayed in a second view of the plurality of views;
    repositioning the second visual representation in the GUI, wherein
        the repositioning moves the second visual representation out of the second view,
        the first view continues to display the first visual representation; and
    the pinning, the displaying, and the repositioning facilitates comparison of the first individual object in all or portion of the first backup set and the second individual object in all or portion of the second backup set, wherein
    the pinning comprises
        determining whether a pin command associated with the first backup set indicates an active pin, and
        when the pin command indicates an active pin, pinning the first backup set in the first view, and
    the comparison identifies one or more differences between the first individual object and the second individual object.

2. The computer-implemented method of claim 1, wherein
    the repositioning moves the second visual representation of the second backup set comprising the second individual object to a third view of the plurality of views, and
    the repositioning moves a third visual representation of a third backup set comprising a third individual object of the plurality of backup sets into the second view.

3. The computer-implemented method of claim 1, wherein the repositioning occurs in response to a slide command from a scroll bar of the GUI.

4. The computer-implemented method of claim 1, wherein the plurality of backup sets comprising one or more individual objects are generated from data maintained in a computer system, and the data comprises a hierarchy of individual objects.

5. The computer-implemented method of claim 4, further comprising:
    displaying a live copy visual representation of the data, wherein
        the live copy visual representation is displayed in a third view of the plurality of views in the GUI, and
        the third view is configured to show at least one individual object of the data.

6. The computer-implemented method of claim 1, wherein each of the plurality of backup sets comprise a hierarchy of individual objects, and each of the plurality of views is configured to show a GUI control representing the hierarchy of individual objects for a respective one of the plurality of backup sets.

7. The computer-implemented method of claim 1, further comprising:
    displaying a third visual representation of a third backup set comprising a third individual object in the GUI, wherein
        the third backup set is one of the plurality of backup sets comprising one or more individual objects,
        the third backup set is distinct from the first backup set comprising the first individual object and the second backup set comprising the second individual object, and
        the third visual representation is displayed in the second view;
    pinning the third visual representation in the second view in the GUI; and
    unpinning the first visual representation, subsequent to the pinning the third visual representation.

8. The computer-implemented method of claim 1, further comprising:
    unpinning the first visual representation of the first backup set comprising the first individual object;
    displaying a third visual representation of a third backup set comprising a third individual object in the GUI, subsequent to the unpinning the first visual representation, wherein
        the third backup set comprising the third individual object is one of the plurality of backup sets comprising one or more individual objects, the third backup set is distinct from the first backup set comprising the first individual object and the second backup set comprising the second individual object, and the third visual representation of the third backup set comprising the third individual object is displayed in the first view; and pinning the third visual representation of the third backup set comprising the third individual object in the first view in the GUI.

9. A non-transitory computer readable storage medium configured to store program instructions that, when executed on a processor, are configured to cause the processor to:

a first visual representation of a first backup set comprising a first individual object in a graphical user interface (GUI), wherein the first backup set is one of a plurality of backup sets, and the first visual representation of the first backup set comprising the first individual object is displayed in a first view of a plurality of views of the GUI;

display a second visual representation of a second backup set comprising a second individual object in the GUI, wherein the second backup set is one of the plurality of backup sets comprising one or more individual objects, the second backup set is distinct from the first backup set, and the second visual representation of the second backup set comprising the second individual object is displayed in a second view of the plurality of views;

reposition the second visual representation of the second backup set comprising the second individual object in the GUI, wherein the repositioning moves the second visual representation out of the second view, the first view continues to display the first visual representation; and the pinning, the displaying, and the repositioning facilitates comparison of the first individual object in all or portion of the first backup set and the second individual object in all or portion of the second backup set, wherein the pinning comprises determining whether a pin command associated with the first backup set indicates an active pin, and when the pin command indicates an active pin, pinning the first backup set in the first view, and the comparison identifies one or more differences between the first individual object and the second individual object.

10. The non-transitory computer readable storage medium of claim 9, wherein the repositioning moves the second visual representation to a third view of the plurality of views, and the repositioning moves a third visual representation of a third backup set of the plurality of backup sets into the second view.

11. The non-transitory computer readable storage medium of claim 9, wherein the repositioning occurs in response to a slide command from a scroll bar of the GUI.

12. The non-transitory computer readable storage medium of claim 9, wherein the plurality of backup sets are generated from data maintained in a computer system, and the data comprises a hierarchy of individual objects.

13. The non-transitory computer readable storage medium of claim 12, the method further comprising:

displaying a live copy visual representation of the data, wherein the live copy visual representation is displayed in a third view of the plurality of views in the GUI, and the third view is configured to show individual object visual representations of the live copy visual representation.

14. The non-transitory computer readable storage medium of claim 9, wherein each of the plurality of backup sets comprise a hierarchy of individual objects, and each of the plurality of views is configured to show a GUI control representing the hierarchy of individual objects for a respective one of the plurality of backup sets.

15. The non-transitory computer readable storage medium of claim 9, the method further comprising:

displaying a third visual representation of a third backup set comprising a third individual object in the GUI, wherein the third backup set is one of the plurality of backup sets, the third backup set is distinct from the first backup set comprising the first individual object and the second backup set comprising the second individual object, and the third visual representation of the third backup set comprising the third individual object is displayed in the second view;

pinning the third visual representation of the third backup set comprising the third individual object in the second view in the GUI; and unpinning the first visual representation of the first backup set comprising the first individual object, subsequent to the pinning the third visual representation of the third backup set comprising the third individual object.

16. The non-transitory computer readable storage medium of claim 9, the method further comprising:

unpinning the first visual representation comprising the first individual object;

displaying a third visual representation of a third backup set in the GUI, subsequent to the unpinning the first visual representation, wherein the third backup set is one of the plurality of backup sets comprising one or more individual objects, the third backup set comprising the third individual object is distinct from the first backup set comprising the first individual object and the second backup set comprising the second individual object, and the third visual representation of the third backup set comprising the third individual object is displayed in the first view; and pinning the third visual representation of the third backup set comprising the third individual object in the first view in the GUI.

* * * * *

UNITED STATES PATENT AND TRADEMARK OFFICE
CERTIFICATE OF CORRECTION

Page 1 of 1

PATENT NO.           : 9,031,908 B1
APPLICATION NO.      : 13/544602
DATED                : May 12, 2015
INVENTOR(S)          : Christopher Greene and Kirk Freiheit

It is certified that error appears in the above-identified patent and that said Letters Patent is hereby corrected as shown below:

Claims

Column 11
Line 14, in Claim 9, replace: "a first visual representation" by -- pin a first visual representation --

Column 12
Line 7, in Claim 13, replace: "the method" by -- the program instructions --
Line 23, in Claim 15, replace: "the method" by -- the program instructions --
Line 43, in Claim 16, replace: "the method" by -- the program instructions --

Signed and Sealed this
Seventeenth Day of May, 2016

Michelle K. Lee
*Director of the United States Patent and Trademark Office*